US012569788B2

(12) United States Patent
Schmitt et al.

(10) Patent No.: US 12,569,788 B2
(45) Date of Patent: Mar. 10, 2026

(54) FILTER ASSEMBLY WITH MINIMIZED PRESSURE WITH REPLACEABLE ELEMENT THEREFORE WITH INTEGRATED DIVERTER ENDCAP

(71) Applicant: Schroeder Industries, LLC, Leetsdale, PA (US)

(72) Inventors: Michael J. Schmitt, Pittsburgh, PA (US); Christopher B. Bortnik, Warrendale, PA (US); Trevor A. Jaworski, Pittsburgh, PA (US); Scott F. Surdick, Dormont, PA (US); David L. Cowder, Coraopolis, PA (US)

(73) Assignee: SCHROEDER INDUSTRIES, LLC, Leetsdale, PA (US)

( * ) Notice: Subject to any disclaimer, the term of this patent is extended or adjusted under 35 U.S.C. 154(b) by 934 days.

(21) Appl. No.: 17/306,326

(22) Filed: May 3, 2021

(65) Prior Publication Data

US 2021/0260505 A1 Aug. 26, 2021

Related U.S. Application Data

(63) Continuation of application No. PCT/US2019/059663, filed on Nov. 4, 2019.
(Continued)

(51) Int. Cl.
*B01D 29/92* (2006.01)
*B01D 29/11* (2006.01)
(Continued)

(52) U.S. Cl.
CPC .......... *B01D 29/925* (2013.01); *B01D 29/117* (2013.01); *B01D 29/96* (2013.01);
(Continued)

(58) Field of Classification Search
CPC .... B01D 29/925; B01D 29/117; B01D 29/96; B01D 35/06; B01D 35/147; B01D 2201/12; B01D 2201/291; B01D 2201/4092
(Continued)

(56) References Cited

U.S. PATENT DOCUMENTS

| | | | |
|---|---|---|---|
| 4,626,348 A | 12/1986 | Stone | |
| 6,555,000 B2 | 4/2003 | Knight | |

(Continued)

FOREIGN PATENT DOCUMENTS

| | | |
|---|---|---|
| WO | 2020093046 | 5/2020 |

*Primary Examiner* — Madeline Gonzalez
(74) *Attorney, Agent, or Firm* — Blynn L. Shideler; Krisanne Shideler; BLK Law Group

(57) ABSTRACT

A high pressure filter assembly with minimal pressure drop includes a filter assembly with a cylindrical filter element housing having a central inlet at one end and an angled peripheral outlet on an opposite end, and an inside-out flow filter element coupled to the inlet having a lower endcap and an upper endcap assembly and filter media extending between the upper endcap assembly and the lower endcap, and wherein the upper endcap assembly includes an upper end cap and a diverter plate coupled to and spaced from an upper endcap of the upper end cap assembly with at least one vertical strut, wherein the diverter plate is angled in the direction of the angled peripheral outlet in a centerline plane of the peripheral outlet.

20 Claims, 4 Drawing Sheets

Related U.S. Application Data

(60) Provisional application No. 62/754,930, filed on Nov. 2, 2018.

(51) Int. Cl.
| | |
|---|---|
| *B01D 29/96* | (2006.01) |
| *B01D 35/06* | (2006.01) |
| *B01D 35/147* | (2006.01) |

(52) U.S. Cl.
CPC ........... *B01D 35/06* (2013.01); *B01D 35/147* (2013.01); *B01D 2201/12* (2013.01); *B01D 2201/291* (2013.01); *B01D 2201/4092* (2013.01)

(58) Field of Classification Search
USPC ....... 210/238, 130, 450, 493.2, 167.29, 222, 210/444, 442, 455, 470, 247, 320
See application file for complete search history.

(56) References Cited

U.S. PATENT DOCUMENTS

| | | | | |
|---|---|---|---|---|
| 7,396,460 B2 * | 7/2008 | Wnuk | ...................... | B03C 1/284 |
| | | | | 210/695 |
| 8,349,173 B2 | 1/2013 | Evanovich et al. | | |
| 2005/0252848 A1 * | 11/2005 | Miller | ................... | B01D 29/23 |
| | | | | 210/450 |
| 2014/0033668 A1 * | 2/2014 | Kleynen | ............... | B01D 29/21 |
| | | | | 55/502 |

* cited by examiner

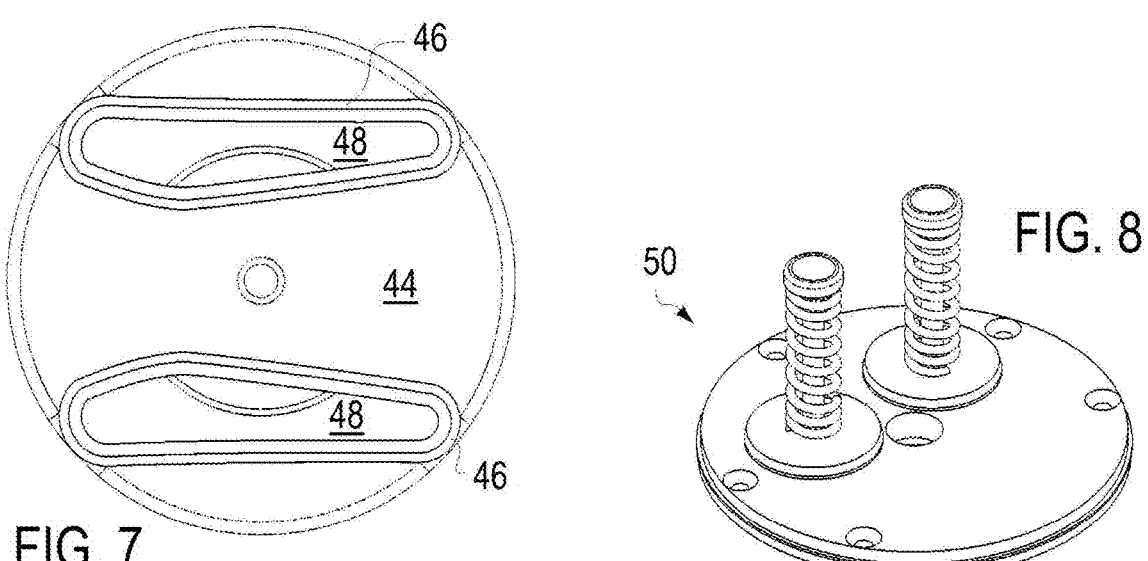
FIG. 7
FIG. 8
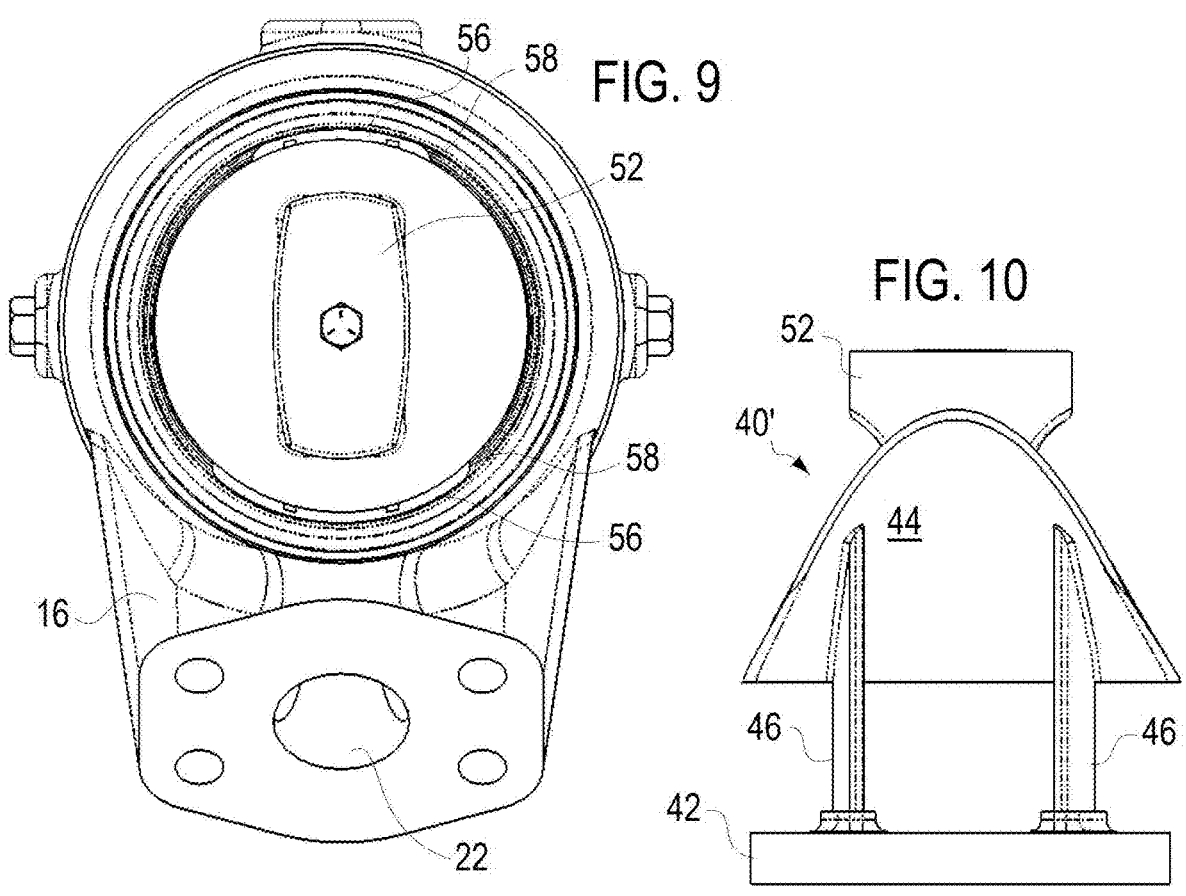
FIG. 9
FIG. 10

1

FILTER ASSEMBLY WITH MINIMIZED PRESSURE WITH REPLACEABLE ELEMENT THEREFORE WITH INTEGRATED DIVERTER ENDCAP

This application is a continuation in part of International Application Serial Number PCT/US 2019/059,663 filed Nov. 4, 2019 and published May 7, 2020 as publication number WO 2020/093046 which publication and application are incorporated herein by reference.

International Application Serial Number PCT/US 2019/059,663 claims priority to U.S. patent application Ser. No. 62/754,930 filed Nov. 2, 2018, entitled "Filter Assembly with Minimized Pressure Drop" which application is incorporated herein by reference in its entirety.

BACKGROUND INFORMATION

1. Field of the Invention

The present invention relates to filter assemblies, and more particular to a high pressure filter assembly with minimal pressure drop.

2. Background Information

Filtration systems are traditionally considered a fluid treatment are part of contamination management. Filtration systems have a pressure drop across the filter assembly which effects the overall operating parameters of the fluid system, particularly in high pressure applications and in applications (which may be considered high pressure situations) is which the fluid immediately downstream of the filter assembly is not being returned to a reservoir or sump. In these "high pressure" applications it can be particularly advantageous to minimize the pressure drop across the filter assembly. However, generally it is advantageous to minimize pressure drop across a filter assembly.

Publication number WO 2020/093046 identifies that U.S. Pat. Nos. 8,349,173, 6,555,000 and 4,626,348 are documents of general interest to the present claimed invention. These patents are incorporated herein by reference. It is noted that the international searching authority identified that the current claimed invention satisfied the criterion of novelty, inventive step and industrial applicability.

There is a need for a cost effective, efficient, filter assembly with minimized pressure drop.

SUMMARY OF THE INVENTION

This invention is directed to a cost effective, efficient, filter assembly with minimized pressure drop.

One aspect of the invention provides a filter assembly including a cylindrical filter element housing having a central inlet at one end and an angled peripheral outlet on an opposite end, and an inside-out flow filter element coupled to the inlet having a lower endcap and an upper endcap assembly and filter media extending between the upper endcap assembly and the lower endcap, and wherein the upper endcap assembly includes an upper end cap and a diverter plate coupled to and spaced from an upper endcap of the upper end cap assembly with at least one vertical strut, wherein the diverter plate is angled in the direction of the angled peripheral outlet in a centerline plane of the peripheral outlet.

One aspect of the invention provides an inside-out flow filter element comprising a lower endcap configured to be coupled to an inlet of a filter housing; filter media extending from the lower endcap; and an upper endcap assembly coupled to the filter media, wherein the upper endcap assembly includes an upper end cap and a diverter plate coupled to and spaced from an upper endcap of the upper end cap assembly with at least one vertical strut, wherein the diverter plate is angled in the direction of an angled peripheral outlet of an associated filter housing when the filter element is installed therein.

These and other advantages of the present invention will be clarified in connection with the preferred embodiments in which like reference numerals represent like elements throughout.

DESCRIPTION OF THE FIGURES

FIG. 7 is a bottom view of the upper endcap assembly of the filter element of FIG. 4 with an upper end cap removed;

FIG. 8 is a perspective view of bypass valve components of a bypass assembly of the upper endcap assembly of FIG. 5;

FIG. 9 is a top view of a filter assembly of FIG. 1 with a top end cap removed;

FIGS. 10-12 are side and front elevation views and a perspective view of a modified upper endcap assembly of FIG. 5.

BRIEF DESCRIPTION OF THE PREFERRED EMBODIMENTS

Figure 1:
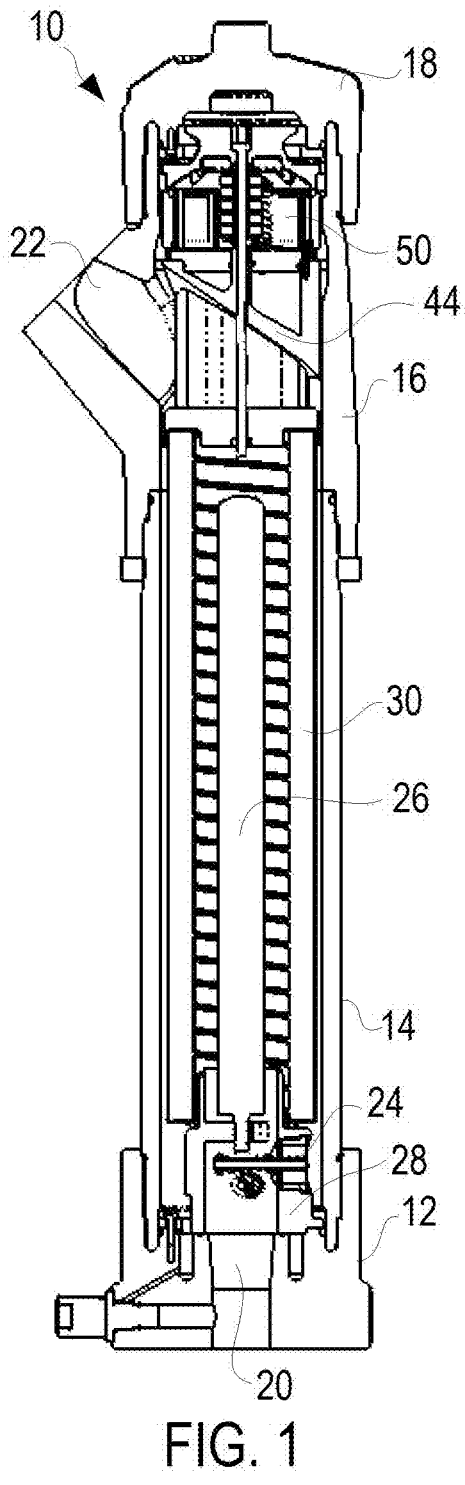
FIG. 1 is a side elevation sectional view of a filter assembly according to one embodiment of the present invention.
Figure 2:
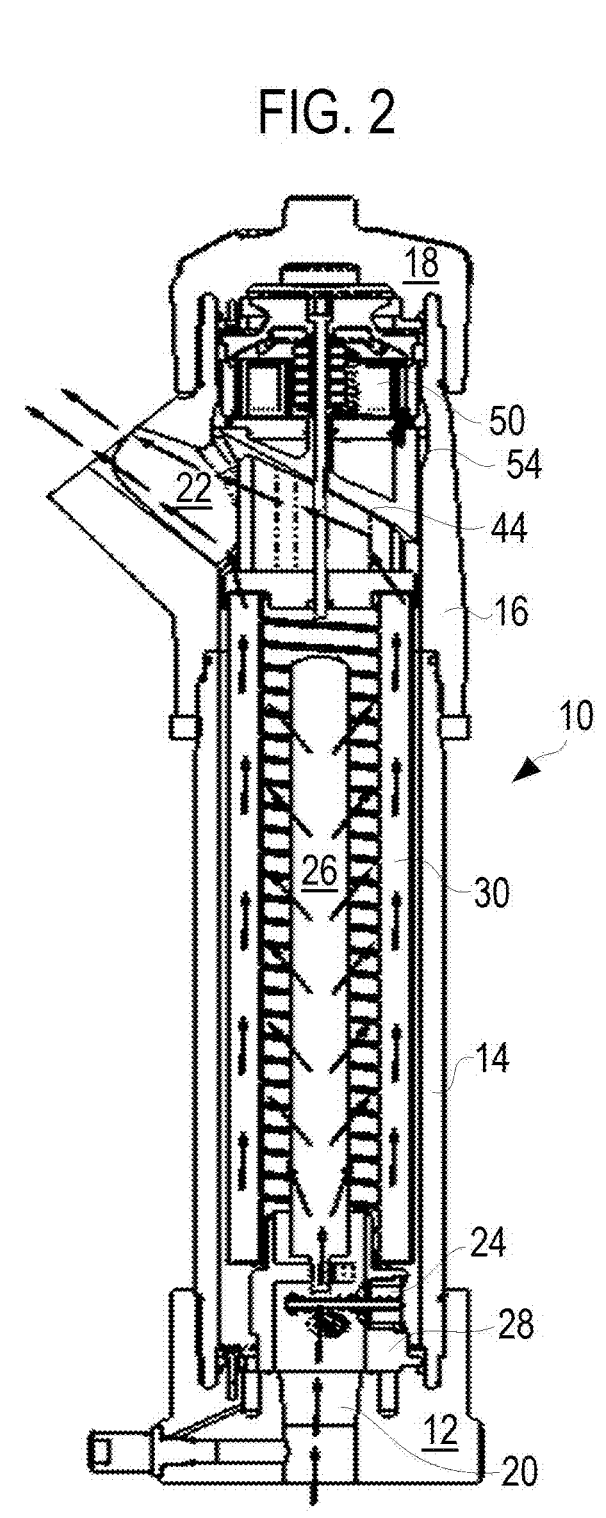
FIG. 2 is a side elevation sectional view of a filter assembly of FIG. 1 with conventional flow path schematically illustrated.

This invention is directed to a cost effective, efficient, a filter assembly 10, or system 10, shown in FIGS. 1-2. The assembly 10 includes a cylindrical filter element housing, shown separately without the associated element 30 in FIG. 3, having as base 12, cylindrical body 14, top 16 and top end cap 18. The filter element housing includes a central inlet 20 at one end in the base 12, and an angled peripheral outlet 22 on an opposite end in the top 16.

Base 12 supports a retrograde bypass assembly 24 and a central magnet 26 within a holder 28. The central magnet 26 facilitates ferrous particulate removal, while the retrograde bypass can facilitate energy efficiencies of the system 10 as a whole for hydrostatic applications, particularly when implemented in electric vehicles or the like. In an electric vehicle environment, wasted pressure drop is wasted energy that drains the battery faster. Magnets for ferrous particulate removal and retrograde bypass assemblies are generally known in the art.

As schematically shown in FIG. 2, The filter element housing is designed for inside-out flow with flow entering in the central inlet 20 or inlet port at the bottom, through the inside out element 30 and exit through a 45 degree outlet 22 or outlet port in the periphery of the housing in the top 16.

The outlet port 22 is generally in the shape of a cone, and is formed as a gradually reducing conical shape, to gradually direct the flow to the outlet and reduce the pressure drop through the system 10. The housing has a threaded access port through the removable top end cap 18 for accessing and replacing the filter element 30 therein.

Figures 3, 4, 5, 6:
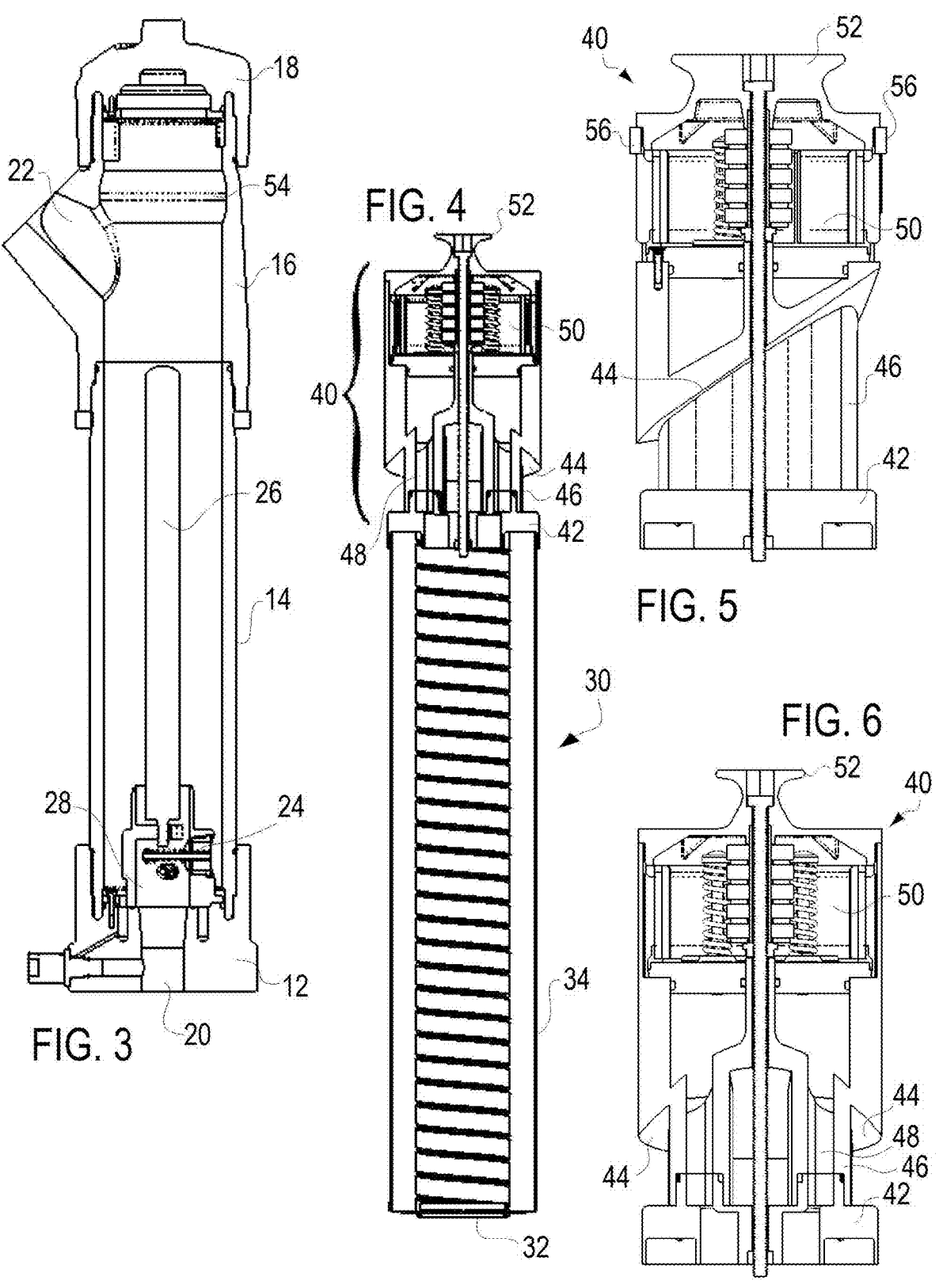
FIG. 3 is a side elevation sectional view of a filter housing with a filter element removed of the filter assembly of FIG. 1.
FIG. 4 is a side elevation view of the filter element of the filter assembly of FIG. 1.
FIG. 5 is a side elevation view of an upper endcap assembly of the filter element of FIG. 4.
FIG. 6 is a sectional view of the upper endcap assembly of the filter element of FIG. 4.

The filter element 30, shown separately in FIG. 4, includes a lower endcap 32 having a seal engaging with the inlet port 20 in a conventional fashion. Filter media 34 of conventional design, such as pleated media or the like, extends from the lower endcap 32 to an upper endcap assembly 40.

A key feature of the present invention is formation of the upper endcap assembly 40, shown in FIGS. 5-6, of the invention that includes an upper endcap 42 and a diverter plate 44 coupled to and spaced from an upper endcap 42 of the filter element 30 by support struts 46. The upper endcap 42 is generally conventional. The diverter plate 44 is angled in the direction of the angled peripheral outlet 22 in the centerline plane of the peripheral outlet 22 and has a smooth curved profile in a centerline plane of the housing which is perpendicular to the centerline plane of the angled outlet 22. The centerline plane of the housing which is perpendicular to the centerline plane of the angled outlet 22 also follows or is along the longitudinal axis of the cylindrical housing.

Specifically, the diverter plater 44 has an inner surface that follows a projection of the cone forming the peripheral outlet 22 through about ⅔-⅘ of the length from the side of the diverter plate adjacent the peripheral outlet 22. The outer edges of the diverter plate inner surface are then formed or shaped as being "rolled down" or turned down in the area spaced furthers from the peripheral outlet 22 to assist in gathering and directing flow. The lower surface of the diverter plate 44 has a continuous smooth surface for directing the fluid flow and reducing pressure drop of the system 10.

The interior of the struts 46 are channels 48, best shown in FIGS. 6 and 7, that align with openings in the upper endcap 42 and direct fluid from upstream of the system 10 (e.g., inside the filter element 30) to a bypass valve structure collectively shown as 50. FIG. 8 shows the actual spring biased valve components of the bypass valve structure 50. The top of the upper endcap assembly 40 includes a handle 52 for ease of handling when inserting and removing the filter element 30.

The operation of the bypass valve structure 50 is conventional, although the placement and use of channels 48 through struts 46 supporting a diverter plate 44 is not at all conventional. In operation of the bypass valve structure 50, if the filter element 30 blinds, pressure increases and the bypass valve will open and allow flow to bypass the media 34. Flow will flow around the assembly 40 to the outlet 22. The top 16 of the housing includes a bypass area 54 to facilitate bypass flow. The upper bypass structure 50 of the invention allows the bypass structure 50 to include an annular mesh/particulate filter such that some filtration occurs even in bypass mode.

In the present invention, it is important to have the diverter plate 44 properly aligned with the outlet 22 to facilitate operation and minimize pressure drop. The assembly 40 can include alignment members (ears) 56 that are received within alignment members (grooves) 58 of the housing, as shown in FIG. 9, to assure proper rotational orientation of the filter element 30 during insertion and replacement.

The system 10 of the present invention provides a high flow filter assembly with minimal pressure drop as compared with conventional comparative filters. The design illustrated operates at 150 gpm (568 L/Min) and 6000 PSI (414) working and fatigue rating. The pressure drop, also called housing drop, at 150 gpm is 2.3 psid. The conventional comparative filters exhibit, for comparison, 11 psid (KF50 Filter operating at 150 gpm) and 7 psid (KF3 operating at 100 gpm).

Figures 11, 12:
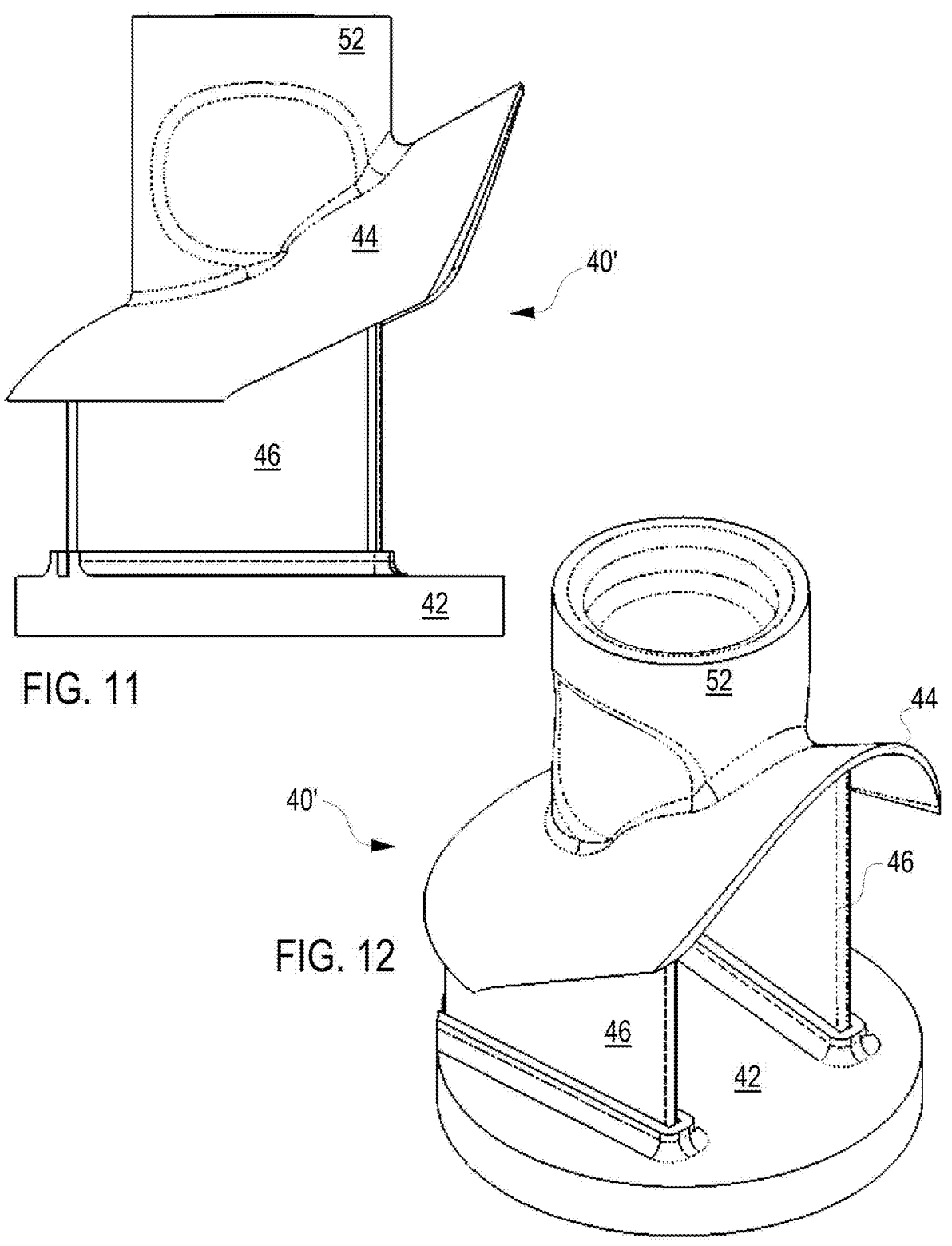

FIGS. 10-12 are side and front elevation views and a perspective view of a modified upper endcap assembly 40' of FIG. 5, wherein the bypass structure is eliminated, as are the channels 48 within the struts 46. This embodiment can be used if the bypass is incorporated elsewhere in the element 30, such as in the lower endcap 32. These figures better show the integral diverter plate 44 and shows that the diverter plate 44 is angled in the direction of the angled peripheral outlet 22 in the centerline plane of the peripheral outlet 22. The distal end of the diverter plate 44 spaced from the outlet 22 is curved down to further gather and direct flow to the outlet 22 with minimal pressure drop as discussed above. An integral handle 52 is formed on the upper surface of the diverter plate 44 as shown.

The front view of the modified upper endcap assembly 40' shows wherein the diverter plate 44 (viewed from the outlet port) has a smooth curved profile in a centerline plane of the housing which is perpendicular to the centerline plane of the angled outlet 22. Additionally this view shows the two vertical struts 46 coupling the diverter plate 44 to the endcap 42 are angled inwardly toward the outlet 22, again to minimize disruption to the fluid flow and minimize pressure drop through the system 10.

The preferred embodiments described above are illustrative of the present invention and not restrictive hereof. It will be obvious that various changes may be made to the present invention without departing from the spirit and scope of the invention. The precise scope of the present invention is defined by the appended claims and equivalents thereto.

What is claimed is:

1. A filter assembly comprising:
   a cylindrical filter element housing having a central inlet at one end and an angled peripheral outlet on an opposite end, and
   an inside-out flow filter element coupled to the inlet having a lower endcap and an upper endcap assembly and filter media extending between the upper endcap assembly and the lower endcap, and wherein the upper endcap assembly includes an upper end cap and a diverter plate coupled to and spaced from the upper endcap of the upper end cap assembly with at least one vertical strut, wherein the diverter plate is angled in the direction of the angled peripheral outlet, wherein the lower endcap has a seal engaging the inlet, and wherein the diverter plate is spaced entirely vertically above the upper end cap.

2. The filter assembly according to claim 1, wherein the angled peripheral outlet extends at about a 45 degree angle from a centerline of the cylindrical filter element housing, and wherein the diverter plate has an inner surface that follows a projection of a cone for a portion of the length from the side of the diverter plate adjacent the peripheral outlet.

3. The filter assembly according to claim 2, wherein the angled peripheral outlet is a conical outlet.

4. The filter assembly according to claim 1, wherein the diverter plate is coupled to and spaced from the upper endcap of the filter element by a pair of the vertical struts, and wherein the diverter plate has an inner surface that follows a projection of a cone for a portion of the length from the side of the diverter plate adjacent the peripheral outlet.

5. The filter assembly according to claim 4, wherein the pair of vertical struts coupling the diverter plate to the upper endcap are angled inwardly toward the outlet.

6. The filter assembly according to claim 5, wherein an end of the diverter plate spaced from the outlet is curved down to further gather and direct flow to the outlet.

7. The filter assembly according to claim 1, further including a retrograde bypass assembly.

8. The filter assembly according to claim 1, further including a central magnet mounted within the filter element.

9. The filter assembly according to claim 1, wherein the upper endcap assembly includes a bypass valve structure above the diverter plate.

10. The filter assembly according to claim 9, wherein at least one vertical strut includes an interior channel coupled to the bypass valve structure.

11. An inside-out flow filter element comprising;

a lower endcap configured to be coupled to an inlet of a filter housing;

filter media extending from the lower endcap; and an upper endcap assembly coupled to the filter media, wherein the upper endcap assembly includes an upper end cap and a diverter plate coupled to and spaced from the upper endcap of the upper end cap assembly with at least one vertical strut, wherein the diverter plate is angled in the direction of an angled peripheral outlet of the filter housing when the filter element is installed therein, and wherein the diverter plate is spaced entirely vertically above the upper end cap.

12. The inside-out flow filter element of claim 11, wherein the diverter plate is coupled to and spaced from the upper endcap of the upper end cap assembly by a pair of the vertical struts, and wherein the diverter plate has an inner surface that follows a projection of a cone for a portion of the length from the side of the diverter plate adjacent the peripheral outlet.

13. The inside-out flow filter element of claim 12, wherein the pair of vertical struts coupling the diverter plate to the upper endcap are angled inwardly toward the outlet.

14. The inside-out flow filter element of claim 11, wherein the upper endcap assembly includes a bypass assembly above the diverter plate.

15. The inside-out flow filter element of claim 14, wherein at least one vertical strut includes an interior channel coupled to the bypass assembly.

16. A replaceable filter element comprising;

a lower endcap;

filter media extending from the lower endcap; and an upper endcap assembly coupled to the filter media, wherein the upper endcap assembly includes an upper end cap and a diverter plate coupled to and spaced from the upper endcap of the upper end cap assembly with at least one vertical strut, and a bypass valve structure above the diverter plate, wherein the diverter plate is angled in the direction of an angled peripheral outlet of an associated filter housing when the filter element is installed therein.

17. The replaceable filter element of claim 16, wherein the diverter plate is coupled to and spaced from the upper endcap of the upper end cap assembly by a pair of the vertical struts, and wherein the diverter plate is spaced entirely vertically above the upper end cap.

18. The replaceable filter element of claim 17, wherein the pair of vertical struts coupling the diverter plate to the upper endcap are angled inwardly toward the outlet, and wherein the diverter plate has an inner surface that follows a projection of a cone for a portion of the length from the side of the diverter plate adjacent the peripheral outlet.

19. The replaceable filter element of claim 16, wherein at least one vertical strut includes an interior channel coupled to the bypass valve structure.

20. The replaceable filter element of claim 16, wherein the upper end cap assembly includes a handle on an upper end thereof.

\* \* \* \* \*